United States Patent
Sadeghvaziri

[19]

[11] Patent Number: 5,901,721
[45] Date of Patent: May 11, 1999

[54] APPARATUS FOR AUTOMATICALLY UNFOLDING AND DISPLAYING A MAP

[76] Inventor: Sahba Sadeghvaziri, 40 E. 94th St. Apt. 19B, New York, N.Y. 10128

[21] Appl. No.: 08/888,885

[22] Filed: Jul. 7, 1997

[51] Int. Cl.⁶ ..................................................... A45B 3/02
[52] U.S. Cl. ............................ 135/16; 135/19.5; 135/24; 135/910; 248/160; 248/156; 40/317; 40/597; 362/102
[58] Field of Search ........................... 135/15.1, 16, 19.5, 135/20.3, 22, 24, 25.4, 25.41, 44, 66, 76, 910; 248/160, 156, 205.5, 206.2; 40/317, 555, 586, 597; 362/102

[56] References Cited

U.S. PATENT DOCUMENTS

| | | | |
|---|---|---|---|
| 218,382 | 8/1879 | Gruyer | 135/33.2 |
| 2,103,948 | 12/1937 | Jones | 135/15.1 X |
| 2,111,368 | 3/1938 | Kron | 248/160 X |
| 2,227,113 | 12/1940 | Talamantes | 135/77 |
| 2,481,271 | 9/1949 | Willey | 248/160 X |
| 2,707,476 | 5/1955 | Clemens | 135/20.1 |
| 3,053,266 | 9/1962 | Burns | 135/20.2 |
| 4,421,133 | 12/1983 | Huang | 135/24 X |
| 4,989,123 | 1/1991 | Best | 135/16 X |
| 5,063,953 | 11/1991 | Wu | 135/25.3 |
| 5,126,922 | 6/1992 | Andreasen | 362/102 X |
| 5,463,536 | 10/1995 | Chou et al. | 362/102 |
| 5,626,418 | 5/1997 | Angelis, Sr. et al. | 248/160 X |

FOREIGN PATENT DOCUMENTS

| | | | |
|---|---|---|---|
| 2277444 | 11/1994 | United Kingdom | 135/16 |

*Primary Examiner*—Carl D. Friedman
*Assistant Examiner*—Winnie Yip
*Attorney, Agent, or Firm*—Edward Etkin, Esq.

[57] ABSTRACT

An apparatus for automatically unfolding and for displaying a road map for use by a driver or a passenger is provided. The road map is preferably made from a resilient fabric or similar material which is stretched over an umbrella-like mechanism that is attached to a shaft, such that when the mechanism is activated, the road map is automatically unfolded by the mechanism to a position perpendicular to the shaft. When the mechanism is inactive the road map is substantially conically folded about the shaft forming a generally cylindrical assembly. The mechanism may be returned to its inactive state automatically, by use of a return mechanism, or manually by the user. A device for attaching the apparatus to an area within a vehicle cabin is also provided. Preferably, the device enables the apparatus to be positioned by the user so as to provide the best viewing position for the user while driving the vehicle. The device is preferably freely detachable from the area to which it may be attached. The apparatus may optionally be provided with a selectively activatable light source for illuminating the road map from the back of the road map.

12 Claims, 2 Drawing Sheets

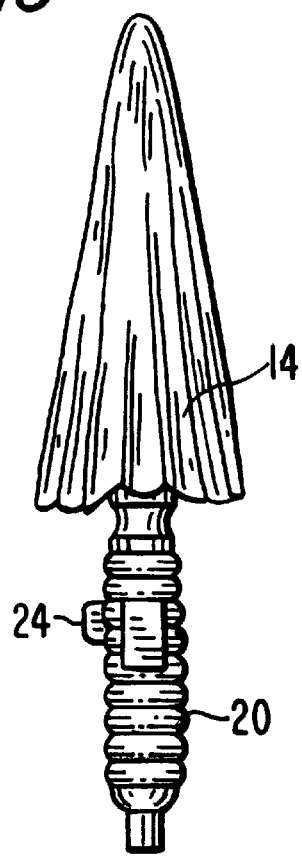
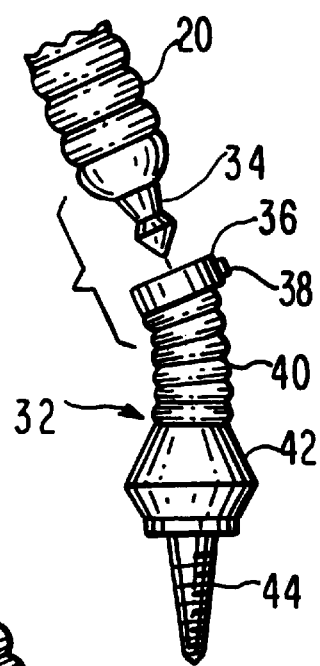
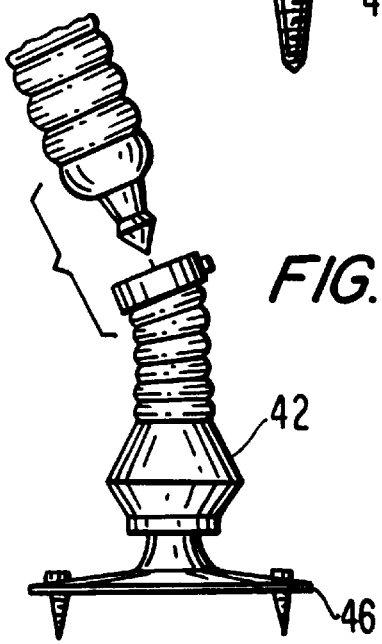
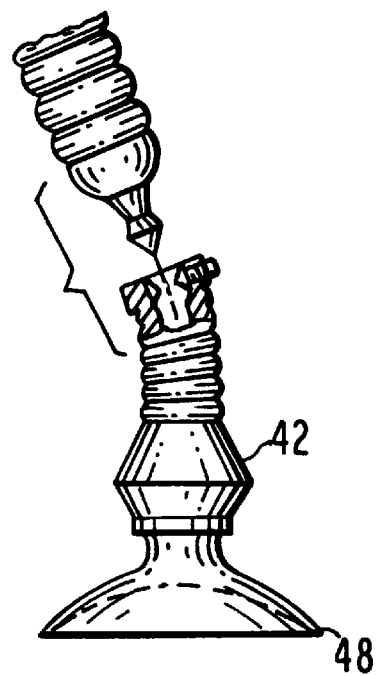

5,901,721

APPARATUS FOR AUTOMATICALLY UNFOLDING AND DISPLAYING A MAP

BACKGROUND OF THE INVENTION

1. Field of the Invention

The present invention relates to devices for folding and unfolding maps. More particularly, the present invention relates to an apparatus for automatically unfolding and displaying a map.

2. Description of the Related Art

Maps are an ever-present part of travel, especially when it comes to travel by a road vehicle such as a car or a truck. Most cars and trucks, in the United States and in other countries, have numerous road maps which drivers (and sometimes passengers) use to navigate complex networks of throughways, turnpikes, highways, and roads. While accuracy and quality of maps have greatly improved with the years, the physical structure of maps has changed very little from ancient times. Most road maps are still paper affairs which are often sold in pre-folded form, to the precise configuration of which most people never manage to return after unfolding the map. Some maps, termed "road atlases" are presented in form of large booklets.

Both types of road maps share a common disadvantage—they are unwieldy and difficult for the driver (and passenger) to use, especially while driving. Use of these road maps may even prove dangerous if a driver attempts to unfold a map or to search through a road atlas while driving (as unfortunately many drivers attempt to do). Not only does the driver need to use at least one hand to unfold a map, but the map must be held and manipulated while driving. Of course the most prudent course of behavior is to pull over and stop the vehicle in order to examine the map; however, this is not always possible as many highways do not have an area suitable for stopping a vehicle. Furthermore, folding maps tend to deteriorate at the creases each time they are folded and unfolded. Many such maps fall apart after frequent use. Another problem with previously known road maps is that they require a light source to be turned on inside the vehicle to be visible. This forces the driver to pay even less attention to the road as a light in a vehicle at night is quite distracting.

It would thus be desirable to provide an apparatus for automatically unfolding a road map for use by a driver or a passenger. It would further be desirable to conveniently display the unfolded map for viewing by driver or passenger. It would also be desirable to provide a backlighting capability to the apparatus so that the unfolded map may be backlit.

SUMMARY OF THE INVENTION

The present invention is directed to an apparatus for automatically unfolding and for displaying a road map for use by a driver or a passenger. In a preferred embodiment the road map is made form a resilient fabric or similar material which is stretched over an umbrella-like mechanism that is attached to a shaft, such that when the mechanism is activated, the road map is automatically unfolded by the mechanism to a position perpendicular to the shaft. The shaft is provided with a conveniently shaped handle so that the user may hold and manipulate the unfolded map. When the mechanism is inactive the road map is substantially conically folded about the shaft forming a generally cylindrical assembly. The mechanism may be returned to its inactive state automatically, by use of a return mechanism, or manually by the user. It is contemplated that any of the various well known umbrella-like mechanisms may be used for this purpose with slight modifications apparent to ones skilled in the art.

A device for attaching the apparatus to an area within a vehicle cabin is also provided. Preferably, the device enables the apparatus to be positioned by the user so as to provide the best viewing position for the user while driving the vehicle. In one embodiment of the present invention, the device is freely detachable by the user from the area to which it may be attached. In another embodiment of the present invention, the apparatus is further provided with a selectively activatable light source for illuminating the road map from the back of the road map.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

FIG. 1C is illustrative of an outside side view of the apparatus of FIG. 1A in an closed position;

FIG. 3A is illustrative of a side view of a first embodiment of a vehicle attachment device for the apparatus of the present invention;

FIG. 3B is illustrative of a side view of a second embodiment of a vehicle attachment device for the apparatus of the present invention; and FIG. 3C is illustrative of a side view of a third embodiment of a vehicle attachment device for the apparatus of the present invention.

DETAILED DESCRIPTION

Figure 1A:
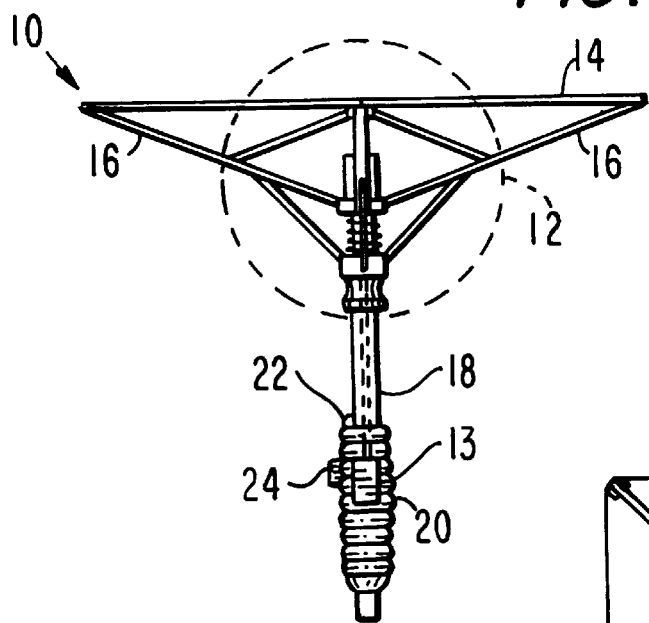
FIG. 1A is illustrative of a schematic side view of an exemplary embodiment of an apparatus in accordance with the present invention.

The present invention provides an apparatus for automatically unfolding and for displaying a road map for use by a driver or a passenger. Referring now to the drawings, and initially to FIG. 1A thereof, the map display apparatus 10 is shown. The apparatus 10 includes an unfolding mechanism 12 that is movably mounted between a first and a second position along an axis of an elongated shaft 18 having a first end and a second end. In the first position, the unfolding mechanism 12 is substantially close to the second end of the shaft 18, while in the second position, it is substantially close to the first end of the shaft 18. The shaft 18 is preferably made from a light and strong material such as hard plastic or hollow metal. The unfolding mechanism 12 includes a plurality of rib members 16 having proximal ends pivotally attached to the unfolding mechanism 12 and distal ends. The plurality of rib members 16 is preferably arranged on the unfolding mechanism 12 in a radial projecting manner and equidistant from one another. Only four members 16 are shown in FIG. 1A, but any number of rib members 16 greater than three may be used.

Figure 1B:
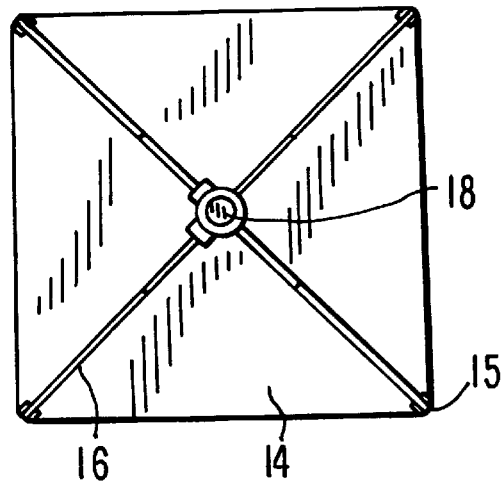
FIG. 1B is illustrative of the apparatus in accordance with FIG. 1A.

A map 14 having a plurality of corners 15 (shown in FIG. 1B) is preferably positioned perpendicular to said shaft and stretched between said distal ends of said rib members 16 such that each corner 15 of said map 14 is attached to a distal end of a rib member 16 (See FIG. 1B). Optionally, the map 14 may be attached at one or more additional positions along each rib member 16. The shape of the map 14 is preferably generally rectangular, but any other geometric shape may be used as a matter of design choice. In accordance with the present invention, when the unfolding mechanism 12 is in the first position, the ribs 16 are substantially parallel to the shaft 18 and the map 14 is folded about the shaft 18 in a substantially cylindrical manner (shown in FIG. 1C); and when the unfolding mechanism 12 is in the second position, the ribs 16 are substantially radially perpendicular to the axis of the shaft 18 and the map 14 is unfolded for display in a planar manner perpendicular to the first end of the shaft 18 as shown in a top view of the map display apparatus 10 in FIG. 1B.

The shaft 18 is preferably provided with a handle 20 positioned at its second end. The handle 20 is preferably ribbed for easier gripping and manipulation of the display apparatus 10. The handle may be made from any resilient material such as plastic or rubber. A locking catch 22 for engaging the unfolding mechanism 12 is also positioned at the second end of the shaft 18. A release button 24 is positioned along the handle 20 and connected to the locking catch 22, for selectively releasing the locking catch 22 when the release button 24 is pressed.

The map display apparatus 10 generally operates as follows. When the unfolding mechanism 12 is moved to the first position it engages the locking catch 22—thus the unfolding mechanism 12 is locked in the first position and the display apparatus 10 assumes a generally cylindrical shape for easy transport and storage. When the locking catch 22 is released by the user pressing the release button 24, the unfolding mechanism 12 automatically moves to the second position, thus unfolding the map 14 for display, by way of a powerful spring device (not shown) that may be mounted external or internal to the shaft 18 between the unfolding mechanism 12 and the handle 20. It should be noted that the unfolding mechanism and its peripheral components such as the rib members 16 are shown only by way of example. It is contemplated that other sheet unfolding mechanisms, such as those used in umbrellas, may be easily adapted to the map display apparatus 12 by ones skilled in the art as a matter of design choice. Alternately an automatic folding mechanism 13 may be connected to the unfolding mechanism 12 and to the release button 24 such that when the map 14 is unfolded and the release button 24 is pressed, the folding mechanism 13 automatically returns the map 14 to a folded position. Automatic folding mechanisms of various types suitable for use with the present invention are well known in the art.

Figure 2:
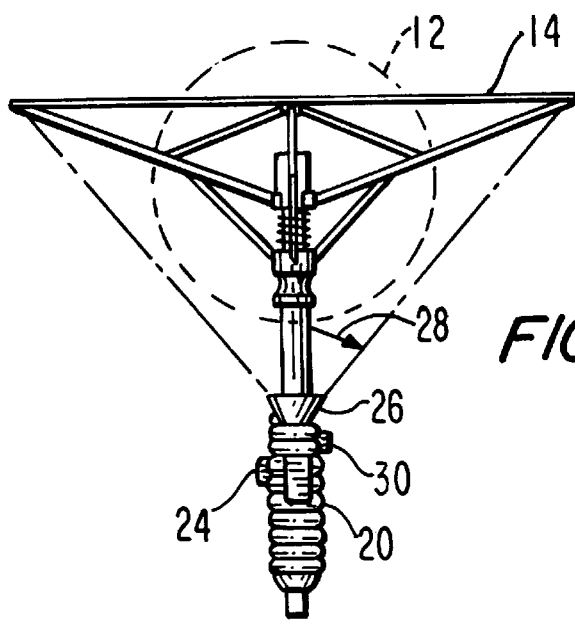
FIG. 2 is illustrative of the side view of the apparatus of FIG. 1A where the apparatus is provided with a backlighting device in accordance with the present invention.

Referring now to FIG. 2, in one embodiment of the present invention, a light source 26 is provided at a top portion of the handle 20, positioned so as to provide light along the shaft 18 in the direction of an underside of the map 14 such that a surface of the map 14 that is visible to the user is thereby illuminated. A light button 30 for selective activation and deactivation by the user of the light source 26 is preferably positioned on a side surface of the handle 20. Preferably, an angle 28 of the light emitted by the light source 26 is such that only the map 14 itself is illuminated and that no light escapes beyond the edges of the map 14 towards the user. To this end, the light source 26 is preferably of the same general shape as the map 14.

Referring now to FIGS. 3A–3C, a device 32 for removably attaching the map display apparatus 10 to an area within a vehicle cabin or the like is provided. In order to connect the map unfolding apparatus 10 to the device 32, an engaging member 34 is preferably provided at an end of the handle 20 opposite to the end of the handle 20 that is attached to the shaft 18. The device 32 includes a hollow collar 36 for receiving the engaging member 34, and a releasable locking mechanism 38 such that when the engaging member 34 is inserted into the collar 36, the locking mechanism 38 locks the map unfolding apparatus 10 to the device 32. The user may release the locking mechanism 38 by pressing upon it or the like in order to remove the map unfolding apparatus 10 from the device 32.

The device 32 is also provided with an attachment portion 42 having a screw 44 in its bottom portion for mounting the device 32 onto a fixed position inside the vehicle cabin. Optionally the single screw 44 may be replaced by a flange 46 with multiple screws. In a preferred embodiment of the present invention, shown in FIG. 3C, the attachment portion is provided with a suction cup 48 at its bottom portion for removable attachment of the device 32 to a position within the vehicle cabin (not shown) such as a window or a dashboard. Alternately, the attachment portion 42 may be glued to an area within the vehicle cabin (not shown).

A flexible member 40 is preferably positioned between the collar 36 and the attachment portion 42 such that when said flexible member is moved to a particular position, it remains in that position until it is moved again. Thus, when the map display apparatus 10 is attached to the mounting device 32, by manipulating the flexible member 40, the user may position the map display apparatus 10 to orient the display of the map 14 in a direction convenient to the user.

It should be understood by one skilled in the art that the apparatus of the present invention may be used in a variety of ways, for example, the map 14 may be replaced by a diagram, a drawing, or another image. In another example the apparatus may be mounted in a location other than a vehicle cabin, such as a desk or a wall.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

I claim:

1. An apparatus for unfolding and displaying a map to a user comprising:

a map comprising geographic information, composed of a flexible material, said map having a first surface and a second surface, wherein said geographic information is disposed on said first surface;

an elongated shaft having a first end, a second end, and a central axis, unfolding means, movably positioned on said shaft along said central axis, and attached to said second surface of said map, for automatically unfolding said map, wherein said unfolding means is movable between a first and a second position along said shaft, such that when said unfolding means is in said first position, said map is folded about said shaft in a substantially cylindrical configuration, and when said unfolding means is in said second position, the map is unfolded to a substantially planar configuration, perpendicular to said shaft, and positioned at said first end of said shaft, such that said first surface of said map is oriented toward and displayed to the user;

a handle positioned at said second end of said shaft for holding said shaft, said handle having a proximal end connected to said second end of said shaft and a distal end; and first activation means, positioned along said handle and connected to said unfolding means, for selective activation of said unfolding means by the user, wherein when said first activation means is activated, said unfolding means is automatically moved from said first to said second position such that said map is unfolded for display to the user, and releasable attachment means, positioned at said distal end of said handle, for releasably attaching the apparatus to a support surface.

2. The apparatus of claim 1, further comprising folding means, connected to said unfolding means and to said first activation means, for causing said unfolding means to return from said second position to said first position when said first activation means is activated while said unfolding means is in said second position.

3. The apparatus of claim 1, further comprising:

light source means positioned along said shaft between said handle and the map, and oriented towards said second surface of said map for projecting light toward the map such that said first surface of said map is back-lit when displayed to the user; and second activation means positioned on one of said handle and said light source means and connected to said light source means for selective activation and deactivation by the user of said light source means.

4. The apparatus of claim 1, wherein said releasable attachment means comprises:

an engaging member positioned at said distal end of said handle;

releasable locking means for receiving said engaging member;

releasable securing means for removable attachment to said surface; and flexible positioning means, connected between said releasable locking means and said releasable securing means, for retaining the apparatus in one of a plurality of positions manually selected by the user.

5. The apparatus of claim 4, wherein said releasable securing means comprises a flat flange with at least one screw for releasable attachment of said apparatus to said support surface.

6. The apparatus of claim 1, wherein said releasable attachment means comprises:

an engaging member positioned at said distal end of said handle;

releasable locking means for receiving said engaging member;

securing means for attachment to said surface; and flexible positioning means, connected between said releasable locking means and said securing means, for retaining the apparatus in one of a plurality of positions manually selected by the user.

7. The apparatus of claim 4, wherein said securing means comprises a flange having an upper portion for attachment to said flexible positioning means and a lower portion covered with an adhesive for attachment to said surface.

8. The apparatus of claim 1, wherein said releasable securing means comprises a flat flange with at least one suction cup for releasable attachment of said apparatus to said surface.

9. An apparatus for unfolding and displaying a map to a user comprising:

a map comprising geographic information, composed of a flexible material, said map having a first surface and a second surface, wherein said geographic information is disposed on said first surface;

an elongated shaft having a first end, a second end, and a central axis, unfolding means, movably positioned on said shaft along said central axis, and attached to said second surface of said map, for automatically unfolding said map, wherein said unfolding means is movable between a first and a second position along said shaft, such that when said unfolding means is in said first position, said map is folded about said shaft in a substantially cylindrical configuration, and when said unfolding means is in said second position, the map is unfolded to a substantially planars configuration, perpendicular to said shaft, and positioned at said first end of said shaft, such that said first surface of said map is oriented toward and displayed to the user;

a handle positioned at said second end of said shaft for holding said shaft, said handle having a proximal end connected to said second end of said shaft and a distal end;

first activation means, positioned along said handle and connected to said unfolding means, for selective activation of said unfolding means by the user, wherein when said first activation means is activated, said unfolding means is automatically moved from said first to said second position such that said map is unfolded for display to the user; and releasable attachment means, positioned at said distal end of said handle, for releasably attaching the apparatus to a surface, said releasable attachment means comprising:

(1) an engaging member positioned at said distal end of said handle;

(2) releasable locking means for releasably receiving said engaging member;

(3) releasable securing means for removable attachment of said apparatus to said surface; and (4) flexible positioning means, connected between said releasable locking means and said releasable securing means, for retaining the apparatus in one of a plurality of positions manually selected by the user.

10. The apparatus of claim 9, wherein said releasable securing means comprises a flat flange with at least one screw for releasable attachment of said apparatus to said surface.

11. The apparatus of claim 9, wherein said releasable securing means comprises a flange having an upper portion for attachment to said flexible positioning means and a lower portion covered with an adhesive for attachment of said apparatus to said surface.

12. The apparatus of claim 9, wherein said releasable securing means comprises a flat flange with at least one suction cup for releasable attachment of said apparatus to said surface.

* * * * *